Jan. 27, 1953
K. C. EBERLY ET AL
2,626,961
1,2,5,6-TETRACHLORO-1,5-CYCLOOCTADIENE
Filed March 30, 1949
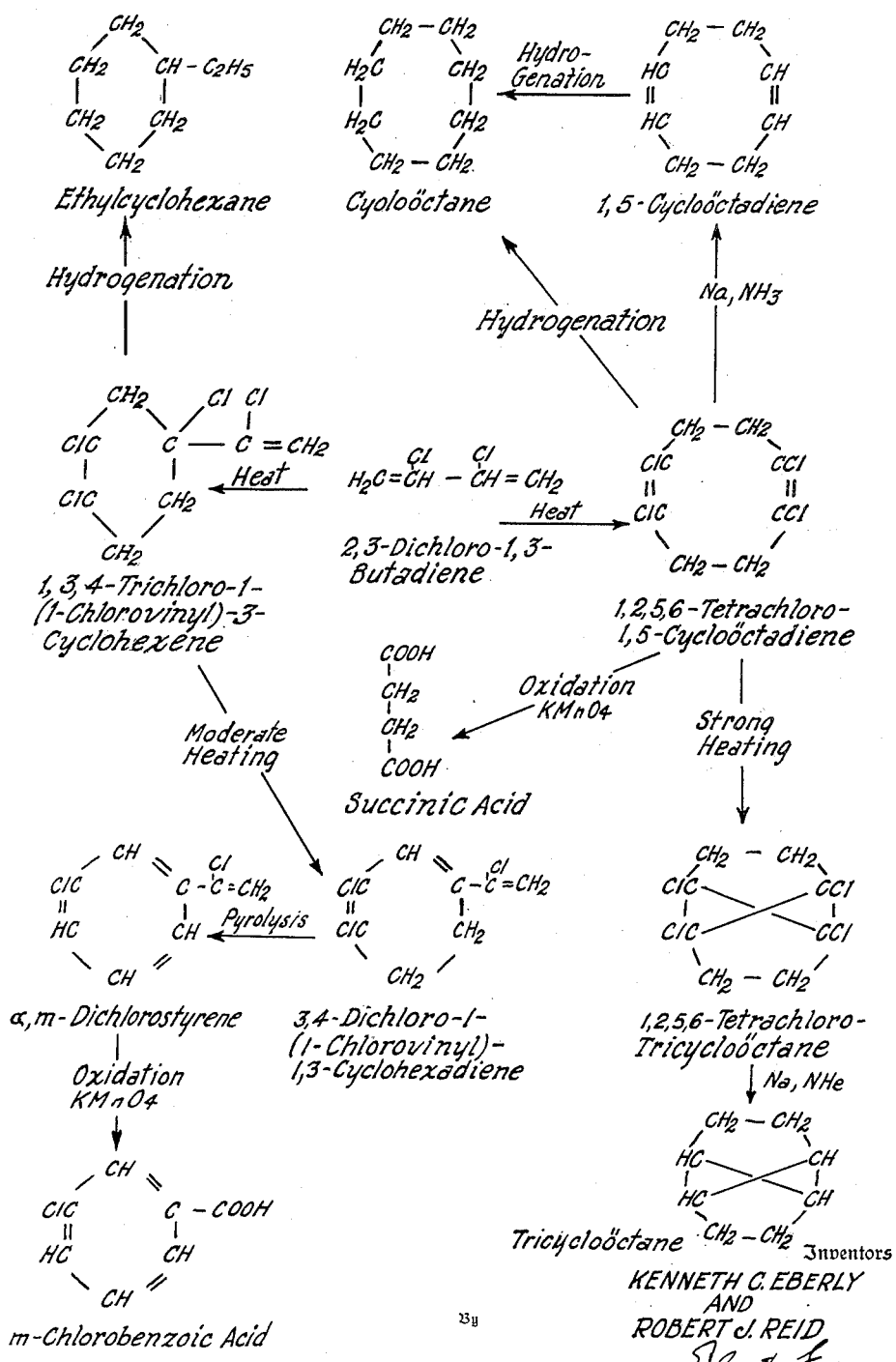
Inventors
KENNETH C. EBERLY
AND
ROBERT J. REID
By
Ely & Frye
Attorneys Patented Jan. 27, 1953

2,626,961

UNITED STATES PATENT OFFICE 2,626,961

1,2,5,6-TETRACHLORO-1,5-CYCLOOCTADIENE

Kenneth C. Eberly, Akron, and Robert J. Reid, Canal Fulton, Ohio, assignors to The Firestone Tire & Rubber Company, Akron, Ohio, a corporation of Ohio Application March 30, 1949, Serial No. 84,388

1 Claim. (Cl. 260—648)

This invention relates to dimers and other products derived from 2,3-dichloro-1,3-butadiene. More particularly the invention relates to the following new compounds:

1,3,4-trichloro-1-(1-chlorovinyl)-3-cyclohexene
3,4 - dichloro - 1 - (1 - chlorovinyl) - 1,3 - cyclohexadiene
α,m-Dichlorostyrene
1,2,5,6-tetrachloro-1,5-cyclooctadiene
1,2,5,6-tetrachlorotricyclooctane
Tricyclooctane The invention includes methods of producing these new products, and reactions utilizing them. All of the products react with chlorine by addition or substitution or both and enter into many other reactions. Thus, the products are useful intermediates in addition to having potential value of themselves as pharmaceuticals, etc.

1,3,4 - trichloro - 1 - (1 - chlorovinyl) - 3 - cyclohexene was obtained in large yield in the dimerization of 2,3 - dichloro - 1,3 - butadiene. The process is described in Example 1. 1,2,5,6-tetrachloro-1,5-cyclooctadiene, also a dimer, was also obtained. To prove the structure of the cyclohexene it was hydrogenated to ethylcyclohexene. This is disclosed in Example 2. Heating and subsequent pyrolysis yielded the new 3,4 - dichloro - 1 - (1 - chlorovinyl) - 1,3 - cyclohexadiene and α,m-dichlorostyrene. These are the processes of Examples 3 and 4. The latter compound was oxidized to m-chlorobenzoic acid to prove its structure. This oxidation is the subject of Example 5. The recovery of the cyclic dimer is described in Example 6.

To prove the structure of the 1,2,5,6-tetrachloro-1,5-cyclooctadiene it was (a) hydrogenated to cyclooctane, as disclosed in Example 7; (b) it was reduced by sodium in liquid ammonia to 1,5-cyclooctadiene, described in Example 8, and this in turn was hydrogenated to cyclooctane as is also described in Example 8; and (c) it was gently oxidized to succinic acid as described in Example 9.

The new 1,2,5,6-tetrachlorotricyclooctane was obtained by heating 1,2,5,6-tetrachloro-1,5-cyclooctadiene. The production of the cyclic dimer is described in Example 1, and its recovery in Example 6. Its conversion to 1,2,5,6-tetrachlorotricyclooctane is disclosed in Example 10. Reduction with sodium in liquid ammonia, as described in Example 11, yielded tricyclooctane. Attempts to hydrogenate both the 1,2,5,6-tetrachloro-1,5-cyclooctadiene and tricyclooctane were unsuccessful. Attempted oxidation of 1,2,5,6-tetrachloro-1,5-cyclooctadiene is described in Example 12.

The accompanying drawing is a flow sheet of the several processes described above.

EXAMPLE 1

*Dimerization of 2,3-dichloro-1,3-butadiene*

A mixture of 1050 grams of purified 2,3-dichloro-1,3-butadiene and 5 grams of phenyl-β-naphthylamine was heated under reflux in an atmosphere of nitrogen for 132 hours at 60° C. At the end of this period so much high polymer had formed that the reaction had to be halted. However, all of the high polymer had been formed in the last few hours. At the end of the heating period the liquid portion was filtered off, and the high polymer was washed with five 1000-cc. portions of acetone then dried at 70° C. The dried high polymer weighed 420.2 grams. The acetone extracts were combined with the original filtrate, and the acetone was then fractionated off. About 300 cc. of methanol were then added to the residual liquid, then it was fractionated off carrying over any remaining monomeric 2,3-dichloro-1,3-butadiene. Thirty-six and one-half grams were recovered. The final residual liquid was repeatedly distilled at 13 mm. pressure yielding 302.2 grams of 1,3,4-trichloro-1-(1-chlorovinyl)-3-cyclohexene (boiling near 155° C.), 86.8 grams of 1,2,5,6-tetrachloro-1,5-cyclooctadiene (boiling near 175° C.) and 44.3 grams of a tar that seemed to be principally polymeric trichlorovinylcyclohexadiene, equivalent to 52.0 grams of 1,3,4 - trichloro - 1 - (1 - chlorovinyl) - 3 - cyclohexene from which it was derived. Table 1 summarizes the results of the dimerization of 2,3-dichloro-1,3-butadiene.

TABLE 1

*Dimerization of 1050 grams of 2,3-dichloro-1,3-butadiene in 132 hours at 60° C.*

| Item | Weight (gms.) | Yield (percent of theory) |
|---|---|---|
| Polymeric 2,3-Dichloro-1,3-butadiene | 420.2 | 40.1 |
| Monomeric 2,3-Dichloro-1,3-butadiene | 36.5 | 3.5 |
| 1,3,4-Trichloro-1-(1-chlorovinyl)-3-cyclohexene | 302.2 | 28.8 |
| Polymeric Trichlorovinylcyclohexadiene | 44.3 | 5.0 |
| 1,2,5,6-Tetrachloro-1,5-cyclooctadiene | 86.8 | 8.3 |
| Losses (Unaccounted) | | 14.3 |

Other high-polymerization inhibitors may be used instead of phenyl-β-naphthylamine, such as diphenylamine, p-tert.-butyl-catechol and pyrogallol. Instead of methanol, other alcohols which form an azeotrope with the 2,3-dichloro-1,3-butadiene may be used, such as ethanol, etc.

*1,3,4-trichloro-1-(1-chlorovinyl)-3-cyclohexene*

1,3,4 - trichloro - 1 - (1 - chlorovinyl) - 3 - cyclohexene is a pale yellow, water-immiscible liquid which boils with some decomposition near 155° C. at 13 mm. and with considerable decomposition and expulsion of hydrogen chloride near 250° C. at 735 mm. It was found to be almost impossible to purify this compound without a lesser or greater loss of hydrogen chloride. A representative sample of partial purity has the following physical properties: $d_4^{20}$, 1.423; and $n_D^{20}$, 1.5530.

Anal. calcd. for $C_8H_8Cl_4$: Cl, 57.66. Found: Cl, 57.02.

EXAMPLE 2

*Hydrogenation of 1,3,4-trichloro - 1 - (1 - chlorovinyl) 3-cyclohexene*

A sample (30.0 grams) of partially dehydrochlorinated 1,3,4 - trichloro-1-(1-chlorovinyl)-3-cyclohexene (chlorine, 55.31%) was diluted with 200 cc. of glacial acetic acid and treated with 1.0 gram of Adam's platinum oxide catalyst. The whole was hydrogenated at a pressure of 1020 pounds per sq. in. at 25° C. for four hours. The temperature of reaction soon rose to 50° C., and 0.6 gram-mole of hydrogen was absorbed. On opening the hydrogenation bomb, a copious amount of hydrogen chloride was evolved. The reaction mixture was diluted with water, and an oil (slightly heavier than water) separated. The oil was separated, dried over fused calcium chloride, then fractionated, yielding 2.6 grams of ethylcyclohexane and 17.4 grams of a liquid containing more or less chlorine. The ethylcyclohexane obtained had the following physical properties: B. P. 129–31° C. at 74 mm.; $d_4^{20}$, 0.795 and $n_D^{20}$, 1.4358.

Anal. calcd. for $C_8H_{16}$: C, 85.62; H, 14.37. Found: C, 85.56; H, 14.67.

EXAMPLE 3

*3,4-dichloro-1-(1-chlorovinyl) - 1,3 - cyclohexadiene*

When 1,3,4 - trichloro-1-(1-chlorovinyl)-3-cyclohexene is repeatedly distilled at 10–100 mm. pressure, hydrogen chloride is gradually lost, and a compound which no longer loses hydrogen chloride results. The new compound is 3,4-dichloro-1-(1-chlorovinyl) - 1,3 - cyclohexadiene. It is a colorless, water-immiscible liquid having the following physical properties: B. P., 110–4° C. at 2–4 mm.; $d_4^{20}$, 1.372; and $n_D^{20}$, 1.5545. It readily reacts with bromine to expel hydrogen bromide, presumably aromatizing the compound.

Anal. calcd. for $C_8H_7Cl_3$: Cl, 50.77; mol. wt., 209.52. Found: Cl, 50.83; mol. wt. (in benzene), 217.

EXAMPLE 4

*Pyrolysis of 1,3,4-trichloro - 1(1 - chlorovinyl)-3-cyclohexene to form α,m-dichlorostyrene*

A tube furnace was set up (70 cm. long and 19 mm. inside diameter), and in the inlet end was placed a dropping funnel and at the outlet end was placed a condenser and receiver. In the course of 6 hours 60.0 grams of partially purified 1,3,4 - trichloro-1-(1-chlorovinyl)-3-cyclohexene (chlorine, 57.09%) were passed through the furnace tube maintained at 490–530° C. A black liquid reeking of hydrogen chloride was obtained which was washed and dried, then fractionated. A colorless liquid was collected at 146–8° C. at 100 mm., weighing 19.0 grams. This is α,m-dichlorostyrene, a water-immiscible liquid having the following physical properties: $d_4^{20}$, 1.275; and $n_D^{20}$, 1.5721. The liquid neither readily reacts with bromine nor easily polymerizes, but it does instantly decolorize aqueous potassium permanganate solution.

Anal. calcd. for $C_8H_6Cl_2$: Cl, 40.98; mol. wt., 173.05. Found: Cl, 42.23; mol. wt. (in benzene), 172.

EXAMPLE 5

*Oxidation of α,m-dichlorostyrene to m-chlorobenzoic acid*

Five grams of α,m-dichlorostyrene were boiled with 15 grams of potassium permanganate in 300 cc. of water for four hours under reflux. After decolorizing the whole with sulfur dioxide, acidifying with sulfuric acid, and cooling, 2.5 grams of crystals were recovered. Recrystallization from water and subsequent drying yielded crystals of an acid melting at 139–44° C. When the crystals were mixed with an authentic sample of m-chlorobenzoic acid (M. P., 152° C.) the mixture melted at 145–9° C. The admixture of either o- or p-chlorobenzoic acids depressed the melting point. The acid obtained was partially pure m-chlorobenzoic acid.

Anal. calcd. for $C_7H_5O_2Cl$: Cl, 22.65; Neut. equiv., 156.57. Found: Cl, 23.64; Neut. equiv., 161.4.

EXAMPLE 6

*1,2,5,6-tetrachloro-1,5-cyclooctadiene*

1,2,5,6-tetrachloro-1,5-cyclooctadiene was the higher boiling constituent obtained from the dimerization products of 2,3-dichloro - 1,3 - butadiene. After recrystallization from methanol (1 gram dissolves in 3–4 cc. of boiling methanol) and drying in high vacuum for 24 hours the colorless crystals had the following physical properties: B. P., about 175° C. at 13 mm.; 292° C. (with dec.) at 740 mm.; and M. P., 99–100° C.

Anal. calcd. for $C_8H_8Cl_4$: Cl, 57.66; mol. wt., 245.98. Found: Cl, 57.63; mol. wt. (in benzene), 234.

EXAMPLE 7

*Hydrogenation of 1,2,5,6-tetrachloro - 1,5 - cyclooctadiene to cyclooctane*

A solution of 19.7 grams of 1,2,5,6-tetrachloro-1,5-cyclooctadiene in 200 cc. of glacial acetic acid was treated with 0.4 gram of Adam's platinum oxide catalyst and hydrogenated at a pressure of 50 pounds per sq. in. for five hours. The reaction slowed down at this time, so the bottle was opened, hydrogen chloride was boiled off, 0.4 gram of additional catalyst was added, and the hydrogenation was continued for another eight hours (at the end of which time the calculated amount of hydrogen had been absorbed). Dilution of the hydrogenation mixture with three volumes of water led to the separation of an oil slightly heavier than water. The oil was washed, dried over fused calcium chloride, then fractionated. About 3 grams of cyclooctane were obtained which had the following physical properties: B. P., 148–51° C. at 734 mm.; M. P., 8° C.;

$d_4^{20}$, 0.843; and $n_D^{20}$, 1.4604. These properties compare favorably with those of cyclooctane as reported by Willstaetter and Waser (Ber. 43, 1176 (1910)).

Anal. calcd. for $C_8H_{16}$: C, 85.62; H, 14.37. Found: C, 85.50; H, 14.37.

EXAMPLE 8

*Conversion of 1,2,5,6-tetrachloro-1,5-cyclooctadiene to 1,5-cyclooctadiene*

Following the general method of Cope and Bailey (J. Am. Chem. Soc. 70, 2308 (1948)), 1, 2, 5, 6-tetrachloro-1,5-cyclooctadiene in 60 cc. of dry ether (at 25° C. to prevent crystallization) was added to a stirred solution of 6.2 grams of sodium in liquid ammonia at −75° C. The addition was made in one minute, and the whole was allowed to react for 3 minutes, then the reaction was terminated by the addition of a solution of 22 grams of ammonium nitrate in 150 cc. of liquid ammonia in the course of 0.5 minute. The ammonia was then allowed to evaporate out through a reflux condenser (20 hours). The brown, pasty residue was then treated with water and ether, then the brown solid (seemingly a polymer containing carbon and hydrogen along with a little chlorine) was filtered off and dried (wt. 3 grams). The ethereal layer was separated from the aqueous portion, dried and fractionated in a Craig microcolumn (Craig, Ind. Eng. Chem. Anal. Ed. 9, 441 (1937)). A colorless liquid which hydrogenated with extreme ease to form cyclooctane was obtained. It was a water-immiscible liquid with the following physical properties: B. P., 141° C. at 742 mm.; M. P., −28° C.; $d_4^{20}$, 0.893; and $n_D^{20}$, 1.4829. These properties compare favorably with those for 1,5-cyclooctadiene as reported by Willstaetter and Verguth (Ber. 40, 957 (1907)) and Cope and Bailey, supra. The compound is 1,5-cyclooctadiene. The yield was 0.75 gram or 21 per cent of theory.

Anal. calcd. for $C_8H_{12}$: C, 88.81; H, 11.19. Found: C, 88.67; H, 11.04.

EXAMPLE 9

*Oxidation of 1,2,5,6-tetrachloro-1,5-cyclooctadiene to succinic acid*

A solution of 9.8 grams of 1,2,5,6-tetrachloro-1,5-cyclooctadiene in 400 cc. of acetone and 10 cc. of water was stirred while in the course of 3.5 hours 16.9 grams of finely pulverized potassium permanganate were gradually added. The reaction temperature was kept near 10–20° C. The whole was stirred for an additional 2.5 hours, then the acetone was removed at reduced pressure. The residue was then treated with 400 cc. of water, cooled to 0–15° C., and while being vigorously stirred, 8.4 grams of finely pulverized potassium permanganate were added in the course of 2.5 hours. The whole was stirred for a further 1.5 hours, then filtered. The filtrate was decolorized with sulfur dioxide, acidified with hydrochloric acid, and continuously extracted for 10 hours with ether. The ether was evaporated off leaving 5.7 grams of a crystalline acid. The acid was recrystallized from a very little water, then dried in high vacuum. The acid melted at 184° C. (unc.), and it did not depress the melting point of an authentic sample of succinic acid. The yield of succinic acid was 61 per cent of theory.

Anal. calcd. for $C_4H_6O_4$: neut. equiv., 59.05. Found: neut. equiv., 58.8.

EXAMPLE 10

*Conversion of 1,2,5,6-tetrachloro-1,5-cyclooctadiene to 1,2,5,6-tetrachlorotricyclooctane*

A tube furnace was set up housing a 120-cm. pyrex tube (19 mm. inside diameter) for 70 cm. of its length. An all-glass dropping funnel was sealed to the inlet side of the tube while an extension of 50 cm. of tube beyond the outlet side of the furnace served as a condenser. In the course of 2.5 hours 50.0 grams of molten 1,2,5,6-tetrachloro-1,5-cyclooctadiene were passed through the furnace tube maintained at 460–500° C. Considerable charring took place, and some hydrogen chloride was evolved. The dark crystals in the cool portion of the tube were taken up in acetone, filtered, and then the acetone was fractionated off (the new compound is exceedingly volatile with acetone, methanol, acetic acid, water, etc.) leaving a colorless, crystalline residue (26.5 grams) (53% of theory). Recrystallization from methanol (1 gram dissolves in about 15–20 cc. of boiling methanol) and subsequent drying in vacuum yielded colorless crystals of 1,2,5,6-tetrachlorotricyclooctane, subliming at 230° C. (unc.) and melting under pressure at 237° C. (unc.). The compound is extremely inert, chemically and thermally. Infrared examination shows that there is no unsaturation in the compound.

Anal. calcd. for $C_8H_8Cl_4$: Cl, 57.66; mol. wt., 245.98. Found: Cl, 57.49; mol. wt., 236.

Increasing the temperature increases the rate of transition. Although a temperature in the neighborhood of 500° C. is recommended, a temperature as low as 292° C. (the boiling point of 1,2,5,6-tetrachlorooctadiene) and up to 500° C. and higher may be used.

*Attempts to hydrogenate 1,2,5,6-tetrachlorotricyclooctane*

A solution of 16.0 grams of 1,2,5,6-tetrachlorotricyclooctane in 200 cc. of glacial acetic acid was treated with 0.8 gram of Adam's platinum oxide catalyst and subjected to the following hydrogenation treatments: 19.5 hours at 58 pounds per sq. in. and 25° C.; 6 hours at 58 pounds per sq. in. and 60° C.; and 16 hours at 1230 pounds per sq. in. and 100° C. In no instance was hydrogen taken up nor hydrogen chloride formed.

Identification of product

The empirical formula and molecular weight of 1,2,5,6-tetrachlorotricyclooctane being the same as 1,2,5,6-tetrachloro-1,5-cyclooctadiene from which it was derived, it was at first thought to be a geometric isomer of the latter. However, its resistance to hydrogenation and oxidation caused doubts to be entertained. Independent investigations of the infrared spectra showed no unsaturation existed in the compound. This even excludes a benzenoid structure. The high melting point and tendency to sublime suggested a polycyclic structure. The structure containing two five-membered rings and one four-membered ring was selected because there is less strain in such a structure than in the structure containing three four-membered rings as suggested by Doebner for tricyclooctane. Berichte, 40, 147 (1907).

The structure selected contains four tertiary chlorine atoms and these, as a rule, are very labile. This seems to be at variance with the facts, because the chlorine is very tightly bound in the 1,2,5,6-tetrachlorotricyclooctane. However, each chlorine is attached to a bridge carbon, and such chlorines have been proven to be firmly attached by Bartlett and Knox, J. Am. Chem. Soc. 61, 3184–3192 (1939) and Bartlett and Cohen, J. Am. Chem. Soc. 62, 1183–9 (1940).

As shown in Example 11, metallic sodium in liquid ammonia attacks the chloro-compound to yield a hydrocarbon which resists hydrogenation and oxidation. The molecular refraction of the hydrocarbon greatly favors the calculated molecular refraction figure of 32.56 for tricyclooctane rather than 36.02 calculated for 1,5-cyclooctadiene.

Summary on structure of 1,2,5,6-tetrachlorotricyclooctane: It is high melting, has firmly attached chlorine, resists hydrogenation and oxidation, and yields a hydrogenation- and oxidation-resisting hydrocarbon when treated with sodium in liquid ammonia. The infrared spectrum shows no unsaturation in the compound. Pyrolysis would probably be more prone to create a compound containing two five-membered rings and one four-membered ring, than one containing three four-membered rings.

EXAMPLE 11

*Conversion of 1,2,5,6-tetrachlorotricyclooctane into tricyclooctane*

According to the general method of Cope and Bailey, supra, a solution of 13.2 grams of 1,2,5,6-tetrachlorotricyclooctane in 110 cc. of dry ether (at 25° C. in order to prevent crystallization) was added in the course of one minute to a mechanically stirred solution of 9.9 grams of sodium in 1000 cc. of liquid ammonia kept at −75° C. The whole was allowed to react for 2.5 minutes, then the reaction was terminated by the addition of a solution of 35 grams of ammonium nitrate in 150 cc. of liquid ammonia in 0.5 minute. The ammonia was allowed to evaporate through a reflux condenser (24 hours) leaving a brown, pasty residue. The residue was treated with water and ether, then the whole was filtered. The dried, brown residue (0.5 gram) contained principally carbon and hydrogen. The ethereal portion of the filtrate was separated, dried, and fractionated in a Craig microcolumn (above). Exactly 0.4 gram of tricyclooctane and 6.05 grams of parent product were recovered, making a yield of tricyclooctane based on the parent compound utilized, 13 per cent of theory. Tricyclooctane (not quite pure because of the great volatility of 1,2,5,6-tetrachlorotricyclooctane) is a colorless, water-immiscible liquid having the following physical properties: B. P., 128° C. at 735 mm.; M. P., −32° C.; $d_4^{20}$, 0.924; and $n_D^{20}$, 1.4736. $M_D$ observed is 32.97 while $M_D$ calculated is 32.56. A 50:50 mixture of this compound with 1,5-cyclooctadiene melted from −57 to −51° C. This tricyclooctane will not readily decolorize cold, aqueous potassium permanganate solution, and it will not hydrogenate in 16 hours at a pressure of 40 pounds per sq. in at 25° C.

Anal. calcd. for $C_8H_{12}$: C, 88.81; H, 11.19. Found: C, 87.01; H, 11.34; Cl, 1.64.

EXAMPLE 12

*Oxidation of 1,2,5,6-tetrachlorotricyclooctane*

A solution of 4.0 grams of 1,2,5,6-tetrachlorotricyclooctane in 200 cc. of acetone was gently refluxed on a water bath while in the course of 3 hours 6.9 grams of finely pulverized potassium permanganate were added. The whole was refluxed for another hour, then the acetone was removed at reduced pressure. The residue was taken up in 300 cc. of water, and, whilst stirring, another 3.4 grams of potassium permanganate were added in 3 hours. After stirring for another hour, the reaction mixture was filtered. About 3.4 grams of parent material were recovered from the manganese dioxide cake, indicating that only about 0.6 gram of 1,2,5,6-tetrachlorotricyclooctane was oxidized. The filtrate was decolorized with sulfur dioxide, acidified with hydrochloric acid, and extracted for 10 hours continuously with ether. Evaporation of the ether yielded less than 0.01 gram of oily crystals. Recrystallization of this material from a little water yielded a few milligrams of a chlorine-free acid melting at near 180° C. Too little acid was obtained to be significative of the structure of the starting material.

What we claim is:

1,2,5,6-tetrachloro-1,5-cyclooctadiene having a melting point of 99°–100° C.

KENNETH C. EBERLY.
ROBERT J. REID.

REFERENCES CITED

The following references are of record in the file of this patent:

UNITED STATES PATENTS

| Number | Name | Date |
|---|---|---|
| 2,504,016 | Foster | Apr. 11, 1950 |